US005136207A

United States Patent [19]

Miyake et al.

[11] Patent Number: 5,136,207

[45] Date of Patent: Aug. 4, 1992

[54] PLASMA DISPLAY PANEL HAVING CELL BARRIERS OF PHOSPHOR CONTAINING MATERIAL

[75] Inventors: Toru Miyake; Yoshiki Kudo; Naoshige Higuchi, all of Tokyo, Japan

[73] Assignee: Dai Nippon Insatsu Kabushiki Kaisha, Tokyo, Japan

[21] Appl. No.: 478,966

[22] Filed: Feb. 9, 1990

[30] Foreign Application Priority Data

Feb. 10, 1989 [JP] Japan .................................. 1-31466
Aug. 10, 1989 [JP] Japan .................................. 1-207467

[51] Int. Cl.[5] ........................ H01J 17/18; H01J 61/36; G09B 3/08

[52] U.S. Cl. .................................. 313/582; 313/484; 313/493; 313/486; 340/760

[58] Field of Search ............... 313/484, 493, 582, 586; 340/760, 772, 780

[56] References Cited

U.S. PATENT DOCUMENTS

| | | | |
|---|---|---|---|
| 2,933,648 | 4/1960 | Bentley | 340/781 |
| 3,103,607 | 9/1963 | Rulon | 313/502 |
| 3,916,245 | 10/1975 | Dorf et al. | 313/586 |
| 4,692,662 | 9/1987 | Wada et al. | 313/493 |

FOREIGN PATENT DOCUMENTS 56-91344 7/1981 Japan .
58-150243 9/1983 Japan .

OTHER PUBLICATIONS

Y. Amano, et al., "A New dc PDP with Low Voltage Drive and High Resolution", *Proceedings of the SID*, vol. 23/3 pp. 169–174, 1982.

*Primary Examiner*—Sandra L. O'Shea
*Attorney, Agent, or Firm*—Wegner, Cantor, Mueller & Player

[57] ABSTRACT

A plasma display panel comprises a front plate disposed on the side of a viewer, a rear plate disposed in parallel and opposing the front plate, and the cell barriers arranged between the front and rear plates of matrix shape or linear shape. The cell barrier is formed of a material including a phosphor. The cell barriers are formed by printing multiple times a phosphor paste containing glass frit in an overlapped manner by a screen printing method. The cell barrier is formed in another method in which a positive pattern of cell barriers are formed on the front or rear plate by using photo resist, a slurry containing a phosphor fills in portions except for the pattern of the photo resist, and the photo resist is thereafter removed to thereby form cell barriers. In the case of the cell barrier of a color display PDP, the cell barrier may be composed of a material containing phosphor of different colors each with a width corresponding to a one half width of the cell barrier.

6 Claims, 8 Drawing Sheets

PLASMA DISPLAY PANEL HAVING CELL BARRIERS OF PHOSPHOR CONTAINING MATERIAL

BACKGROUND OF THE INVENTION

The present invention relates to a structure of a plasma display panel (called hereinafter PDP) and more particularly, to a structure of a cell barrier of a color PDP and a method of manufacturing the same.

The conventional technology is first described with reference to FIGS. 11 and 12.

FIG. 11 shows one example representing a structure of a conventional DC-type PDP. Referring to FIG. 11, a flat front plate 121 and a flat rear plate 122 both made of a glass material are arranged parallel to each other in an opposing relation. Both of the plates are supported with a constant interval by cell barriers 123 arranged between the plates 121 and 122. A plurality of parallel anode elements 124 are formed on the rear surface of the front plate 121 and a plurality of parallel cathode elements 125 are also formed on the front surface of the rear plate 122 so as to extend in directions normal to the arrangement of the anode elements 124. A plurality of phosphor screens 126 are also formed on the rear surface of the front plate 121 adjacent both sides of the respective anode elements 124.

In the conventional DC-type PDP shown in FIG. 11, an electric field is produced by the application of a predetermined voltage between the anode elements 124 and the cathode elements 125, whereby an electric discharge is caused in the inside of a plurality of cells 127 as display elements each defined by the front and rear plates 121 and 122 and the cell barrier 123. Ultraviolet rays caused by this discharge make the phosphor screens 126 luminous and a light passing through the front plate 121 is visually observed by a viewer.

FIG. 12 also shows one example representing a structure of a conventional AC-type PDP. Referring to FIG. 12, a flat front plate 128 and a flat rear plate 129 both made of a glass material are arranged parallel to each other in an opposing relation. Both of the plates are supported with a constant interval by cell barriers 130 arranged between the plates 128 and 129. Two crossing electrodes 132 and 133 are disposed on the front surface of the rear plate 129 with a dielectric layer 131 interposed between the electrodes 132 and 133. A dielectric layer 134 and a protection layer 135 are further disposed on the front surface of the outer electrode 133. A phosphor screen 136 is formed on the rear surface of the front plate 128.

In the conventional AC-type PDP shown in FIG. 12, when an A.C. voltage is applied between the two electrodes 132 and 133, electric discharge is caused in a plurality of cells 137 each defined by the front and rear plates 128 and 129 and the cell barrier 130. Ultraviolet rays caused by this discharge make the phosphor screen 136 luminous and a light passing through the front plate 128 is visually observed by a viewer.

The phosphor screen of the conventional DC-type PDP or AC-type PDP of the structure described above is usually formed by coating a photosensitive slurry containing a phosphor, exposing the coated surface by utilizing a photomask having a structure corresponding to a pattern of the phosphor screen, and then carrying out developing and sintering operations. In the formation of a screen of a color PDP, these steps are carried out repeatedly with respect to the phosphor materials having red (R), green (G) and blue (B) colors, respectively. For example, a photosensitive slurry is formed of a mixture containing phosphor, polyvinyl alcohol (PVA) and diazonium salt, and in a certain case, an antifoaming agent and a interfacial active agent may be further added.

In the DC-type PDP and AC-type PDP of FIGS. 11 and 12, the light emitted from the phosphor screen passes through the phosphor screen and is visually observed by a viewer and a certain amount of light is reduced when it passes through the phosphor screen. In order to obviate such defect, there is also provided a PDP in which a phosphor screen is further formed on the wall surface of a cell barrier to increase the luminance and to visually observe a reflected light from the phosphor screen.

However, in the conventional structures of the PDP such as shown in FIGS. 11 and 12, in order to form the phosphor screens of the R, G and B colors on the wall surfaces of the cell barriers which had already been formed, the prior art provides a method for forming the phosphor screen by filling the phosphor coating material of the respective colors provided with the photosensitive properties in the cells, then exposing and developing the coated phosphor screen, or a method for forming the phosphor screen by spraying the respective colored phosphor coating materials one by one by spray method. However, these methods involve complicated processes or steps and provide the problem of the stable formation of the phosphor screen.

SUMMARY OF THE INVENTION

An object of the present invention is to substantially eliminate the defects or drawbacks encountered in the prior art described above and to provide a plasma display panel provided with an improved cell barrier formed of phosphor and also provide a method of manufacturing the plasma display panel capable of forming phosphor screens on the wall surface of the cell barrier easily and accurately.

This and other objects can be achieved according to the present invention, in one aspect, by providing a plasma display panel comprising a front plate disposed on a side of a viewer, a rear plate disposed in parallel to the front panel in an opposing relation, and cell barriers as a display element arranged between the front and rear plate, the cell barriers being of matrix or linear structure forming a plurality of cells, the cell barrier being formed of a material including a phosphor.

In another aspect according to the present invention, there is provided a method of manufacturing a plasma display panel comprising a front plate disposed on a side of a viewer, a rear plate disposed parallel to the front panel in an opposing relation, and a cell barrier as a display element arranged between the front and rear plate, the cell barrier being of matrix or linear structure forming a plurality of cells, the method being characterized in that the cell barriers are formed by printing phosphor paste including glass frit multiple times in an overlapped manner by a screen printing method.

In a further aspect of the present invention, there is provided a method of manufacturing a plasma display panel comprising a front plate disposed on a side of a viewer, a rear plate disposed parallel to the front panel in an opposing relation, and cell barriers as a display element arranged between the front and rear plate, the cell barriers being of matrix or linear structure forming a plurality of cells, the method being characterized in that a pattern of a photo resist is formed at portions except for the formation of the cell barriers with respect to the front or rear plate, a slurry containing phosphor fills in portions except for the pattern of the photo resist, dry a slurry containing a phosphor, and the photo resist is thereafter removed to thereby form cell barriers.

BRIEF DESCRIPTION OF THE DRAWINGS

In the accompanying drawings:

FIGS. 1 to 8 are views representing the first embodiment according to the present invention, in which:

FIG. 2 is a perspective view of cell barriers formed according to the present invention;

FIG. 3 shows a pattern of one example of a color PDP of matrix shape;

FIG. 5 is a schematic view showing a condition in which a light-absorbing layer is formed by means of a roller;

FIG. 6 is a side view of a front plate provided with a cell barrier of the PDP;

FIG. 7 is a sectional view of the PDP provided with linearly arranged cell barriers; and FIG. 8 is a perspective view of the rear plate of the PDP shown in FIG. 7;

FIGS. 9 and 10 are views representing the second embodiment according to the present invention, in which:

FIGS. 9(a) to 9(p) are continuous views showing a series of PDP formation steps according to the second embodiment of the present invention.

DESCRIPTION OF THE PREFERRED EMBODIMENTS

(First Embodiment)

PDP manufactured by Screen Printing Method

1—1 Basic Construction

FIGS. 1A to 1E are views showing a series of steps of forming a phosphor screen of a PDP according to the first embodiment of the present invention, in which a phosphor screen is formed on cell barriers by a screen printing method utilizing a phosphor paste containing a glass frit and a binder.

Figure 1A:
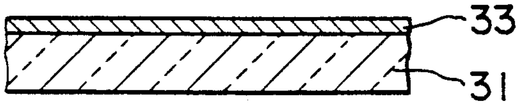
FIGS. 1A to 1E are views showing a screen printing steps for cell barriers of a mono chromatic PDP.
Figure 1B:
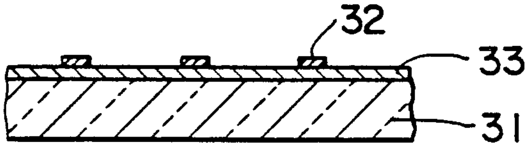
Figure 1C:
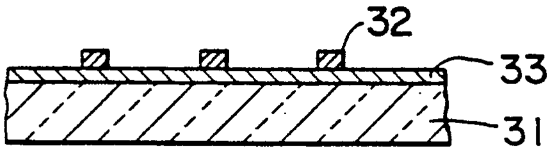
Figure 1D:
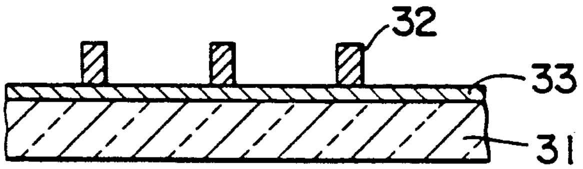

Referring to FIG. 1, a cathode 33 having a thick or thin film is formed on the front side of a flat substrate (rear plate) 31 as shown in FIG. 1A. A phosphor paste containing a glass frit is thereafter printed multiple times by the screen printing method, and according to these steps, the height of the cell barriers is gradually increased as shown in FIGS. 1B, 1C and 1D to thereby form the cell barriers 32 having a predetermined height with a material containing phosphor as shown in FIG. 1D. In the next step, as shown in FIG. 1E, a light-absorbing layer 35 is formed on the upper surface (on the side of a viewer 58) of the cell barriers 32. The light-absorbing layer 35 is formed by the screen printing method utilizing a light-absorbing paste containing a black pigment and a binder for the purpose of preventing the reflection of an external light and improving the contrast of the light.

Figure 1E:
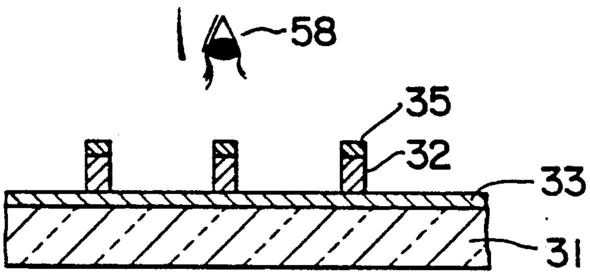
Figure 2:
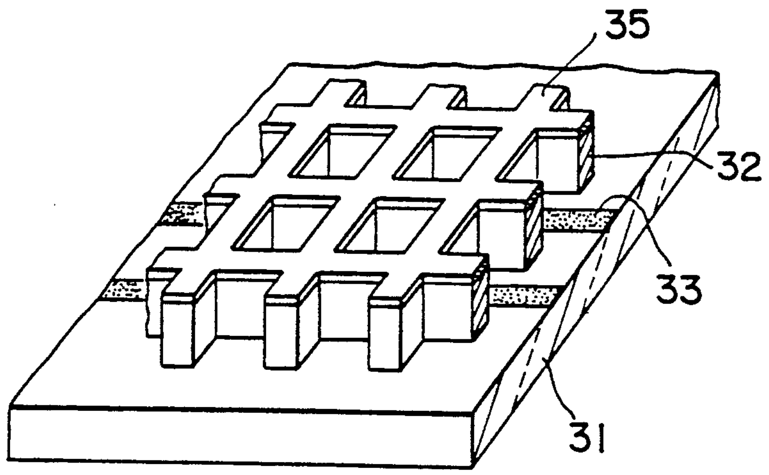

FIG. 2 is a perspective view of the PDP shown in FIG. 1E.

In a case of the PDP of monochromatic-display type which makes luminous the phosphor with monochromatic color of red (R), green (G) or blue (B), the cell barriers of monochromatic color can be formed by repeating the printing operation with a width equal to the width of the cell barriers 32, whereby the cell barriers 32 are itself formed as a phosphor screen.

Figure 3:
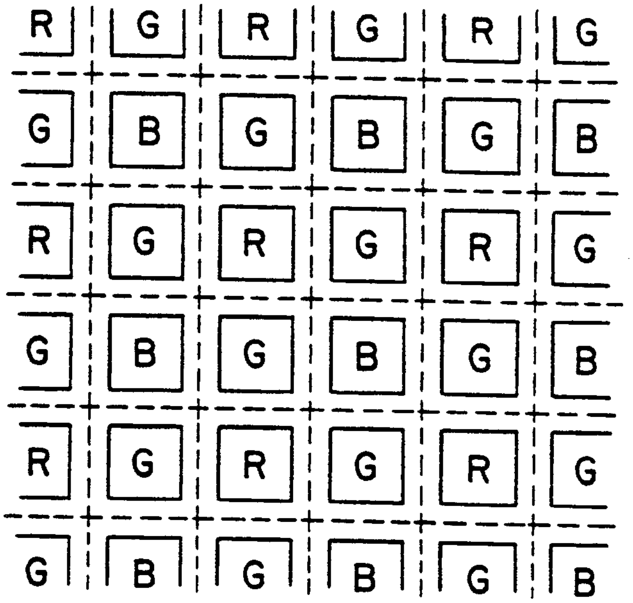
Figure 4A:
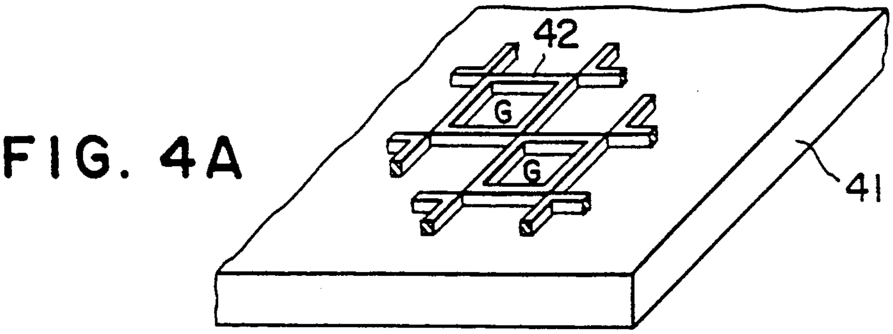
FIGS. 4A to 4D are views showing screen printing steps for cell barriers of the color PDP shown in FIG. 3.
Figure 4B:
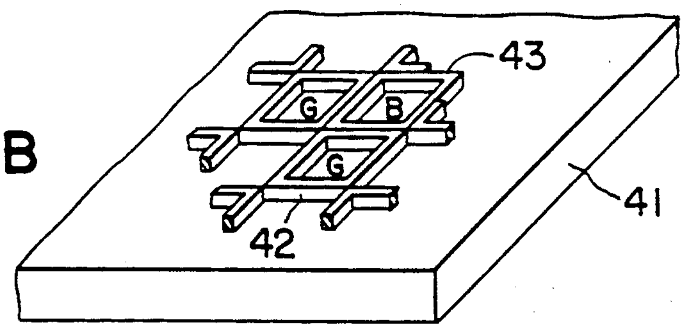
Figure 4C:
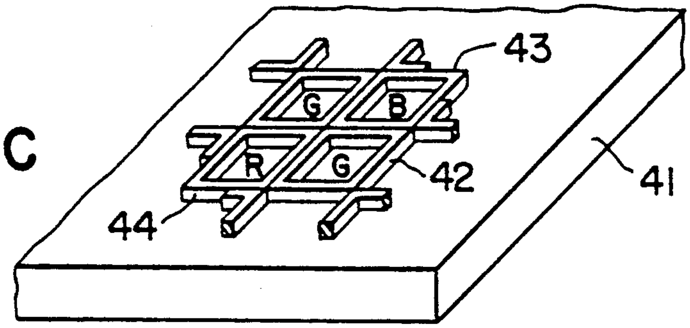
Figure 4D:
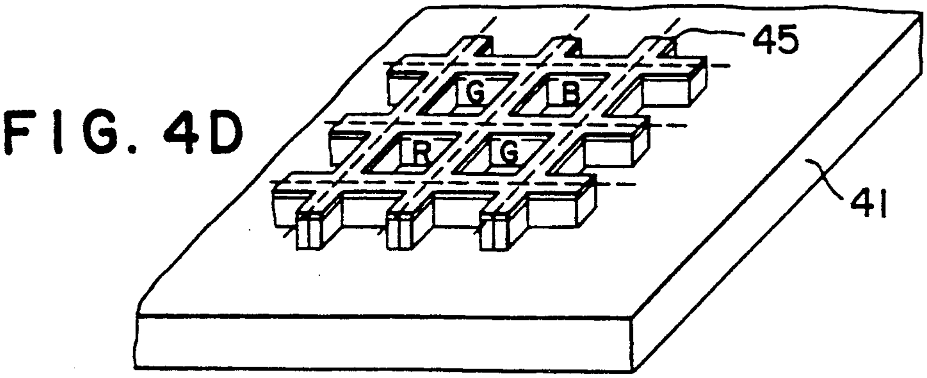

In a case of the color PDP, it is necessary to print the respective phosphor of three colors R, G and B independently. For example, in a case of the matrix-shaped display as shown in FIG. 3, the printing operation of the phosphor of the respective colors by utilizing the phosphor pastes of the respective three colors each with a width of one half times the width of the cell barriers. Namely, as represented by FIGS. 4A to 4D, a first color, green (G), for example, is printed to form cell barriers 42 of one or two layers and then dried (FIG. 4A). Thereafter, a second color, blue (B), for example, is printed to form cell barriers 43 of one or two layers and then dried (FIG. 4B). Finally, a third color, red (R), for example, is printed to form cell barriers 44 of one or two layers (FIG. 4C). These printing operations, as one printing cycle, are repeated until the cell barriers 42, 43 and 44 each having a predetermined height are formed (FIG. 4D). Light-absorbing layers 45 are further formed on the upper portion of the thus formed cell barriers 42, 43 and 44 as shown in FIG. 4D. In FIG. 4, the reference numeral 41 designates a flat substrate and cathode elements are eliminated in the illustration.

The thus formed cell barriers 42, 43 and 44 and the light-absorbing layers 45 are finally sintered to substantially remove the binder, whereby the luminance of the cell barriers can be improved.

The following phosphor may be utilized for the respective colors; red color (R): $Y_2O_3$:Eu, $Y_2SiO_5$:Eu, $Y_3Al_5O_{12}$:Eu, $Zn_3(PO_4)_2$: Mn, $YBO_3$:Eu, (Y,Gd)$BO_3$-:Eu, $GdBO_5$:Eu, $ScBO_3$:Eu, $LuBO_3$:Eu, blue color (B): $Y_2S\ iO_5$:Ce, $CaWO_4$:Pb, $BaMgAl_{14}O_{23}$:Eu; green color (G): $Zn_2SiO_4$:Mn, $BaAl_{12}O_{19}$:Mn, $SrAl_{13}O_{19}$: Mn, $CaAl_{12}O_{19}$:Mn, $YBO_3$Tb, $BaMgAl_{14}O_{23}$:Mn, Lu-$BO_3$:Tb, $GdBO_3$:Tb, $ScBO_3$:Tb, $Sr_6Si_3O_8Cl_4$:Eu.

As a binder to be utilized for the phosphor paste and the light absorbing layer paste, ethyl cellulose, rosin, or the like may be utilized, and as a solvent butyl carbitol acetate (BCA) or the like may be utilized. The paste of the phosphor consists of 40 to 80 wt. % of phosphor, 5 to 15 wt. % of glass frit and the residue of binder and solvent.

It will easily be understood by persons skilled in the art that the foregoing descriptions made for the flat substrate of the DC-type PDP may be substantially applied to the AC-type PDP.

Figure 5:
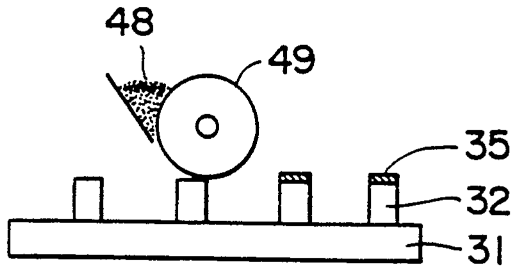

With the embodiment described above, the light-absorbing layers 35 are formed by the screen printing operation as shown in FIG. 1, but the light-absorbing layers 35 may be formed, as shown in FIG. 5, by transferring an ink 48 for the light-absorbing layers to the surface of the cell barriers 32 by means of roller 49. In FIG. 5, reference numeral 31 designates a flat substrate and cathode elements is eliminated in the illustration.

Figure 6:
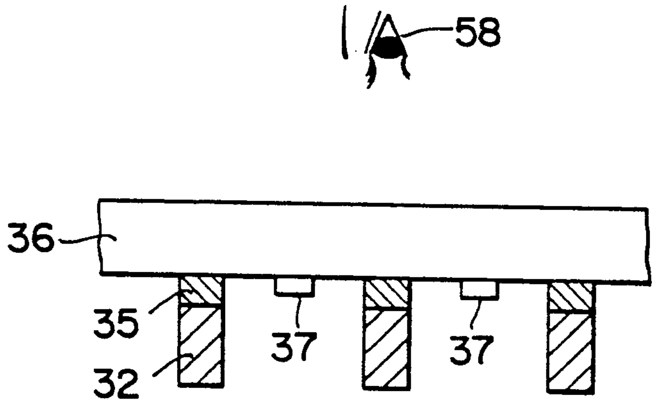

Furthermore, in the embodiment described above, as shown in FIG. 1, the cell barriers 32 are formed on the base plate (rear plate) 31 by the screen printing operation and the light-absorbing layers 35 are also formed on the cell barriers 32 by the screen printing operation, but the present invention is not limited to this embodiment and includes a modification in which the light-absorbing layers 35 may be formed on the front plate 36, provided with the anode element 37, on the side of a viewer 58 by the screen printing operation as shown in FIG. 6 and the cell barriers 32 may be also formed on the thus formed light-absorbing layers 35 by the screen printing operation.

1-2 Examples

Concrete examples according to the first embodiment will be described hereunder.

Example 1

Silver electrodes were printed on a glass substrate (rear plate) with a width of 300 μm by a screen printing method, then dried and sintered to thereby form cathodes. The thus prepared substrate was then washed and, thereafter, a phosphor paste of green color was printed by the screen printing operation and dried at a temperature of 150° C. for 10 minutes. The phosphor paste layer of about 20 μm was formed by the first one printing operation and this printing operation was repeated 7 or 8 times to form cell barriers having a monochromatic color matrix structure with a width of about 200 μm, a height of about 150 μm and a pitch of about 500 μm.

The phosphor paste utilized consists of $Zn_2SiO_4$:Mn (green color) as phosphor of 65 wt. %, glass frit of low temperature type of 10 wt. %, and solution including ethyl cellulose and BAC (weight ratio: 1:9) of 25 wt. %.

A paste for a light-absorbing layers was printed by the screen printing operation on the cell barriers on the side of the viewer and then dried. As a pigment contained in the paste for the light-absorbing layer was utilized an oxide iron-oxide cobalt-oxide chromium series.

After these operations, the cell barriers were sintered at a temperature of about 440° C. for 30 minutes to thereby remove the binder and form the cell barriers and the light-absorbing layers in which the cell barriers of matrix structure of the PDP (green color) are themselves formed as a phosphor screen. Accordingly, the cell barriers themselves were energized and then illuminated by ultraviolet rays due to a plasma discharge so that the viewer can visually observe the reflected light of the phosphor screen, thus providing the PDP with an improved luminant efficiency. Since the light-absorbing layers were formed on the side of the viewer, the reflection of external light can be prevented, thus improving the contrast.

Example 2

This example represents an example relating to the formation of a phosphor screen of a color PDP described with reference to FIG. 4, in which cathode elements are eliminated.

Silver electrodes were printed on a glass substrate (rear plate) with a width of 300 μm by a screen printing method, then dried and sintered to thereby form a cathodes. The thus prepared substrate was then washed and, thereafter, a phosphor paste of green color was printed by the screen printing operation to form single layer of this color and dried at a temperature of 150° C. for 10 minutes (FIG. 4A). The phosphor paste layer has a width of about 100 μm, a height of about 20 μm and a pitch of about 1000 μm. Thereafter, as shown in FIG. 4B, a phosphor paste of blue color was printed by the screen printing operation to form single layer of this color with the same width and height as those in the green color printing and dried at a temperature of 150° C. for 10 minutes. In the next step, as shown in FIG. 4C, a phosphor paste of red color was formed in a manner substantially the same as those in the green and blue color printing operations to thereby form cell barriers with three colored, single layers. These printing operations for forming the three colored single layers were repeated 7 or 8 times to form cell barriers such as shown in FIG. 4D with the final height of about 150 μm.

The phosphor paste utilized consists of $Zn_2SiO_4$:Mn (green color) as a phosphor of 65 wt. %, glass frit of low temperature type of 10 wt. %, and solution including ethyl cellulose and BAC (weight ratio: 1:9) of 25 wt. %. Regarding the blue and red colors, only the phosphor of the green color was substituted by $BaMgAl_{14}O_{23}$:Eu (blue color) and by (Y,Gd)$BO_3$:Eu (red color). Light absorbing layers were then printed by the screen printing operation on the cell barriers.

After these operations, the cell barriers were sintered at a temperature of about 440° C. for 30 minutes to thereby remove the binder and form the color PDP of a matrix structure provided with the light-absorbing layers in which the cell barriers are themselves formed as a phosphor screen. Accordingly, the cell barriers themselves were energized and then illuminated by ultraviolet rays due to a plasma discharge, so that the viewer can visually observe the reflected light of the phosphor screen, thus providing the PDP with improved luminant efficiency. Since the light-absorbing layers were formed on the side of the viewer, the reflection of an external light can be prevented, thus improving the contrast.

Example 3

This example is related to a line shaped PDP including linearly arranged cell barriers.

Figure 7:
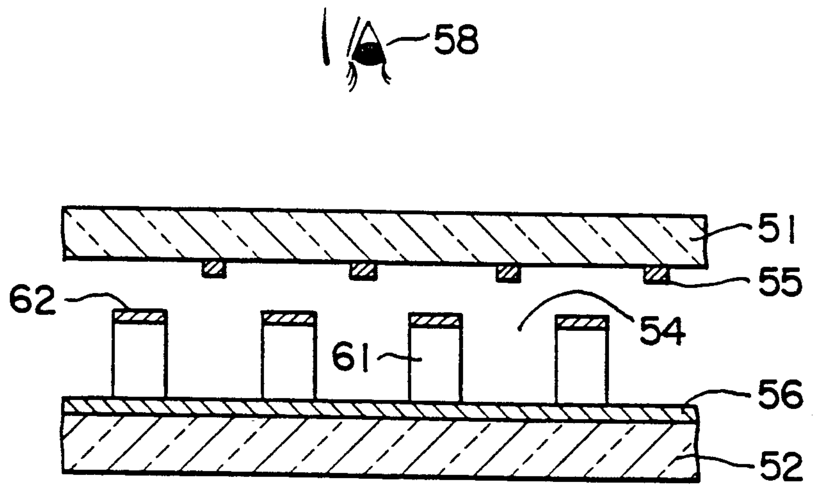

As shown in FIG. 7, cathode elements 56 were first formed on a glass substrate 52 so as to each have a thin or thick film structure with a width of 200 μm and a pitch of 300 μm.

Figure 8:
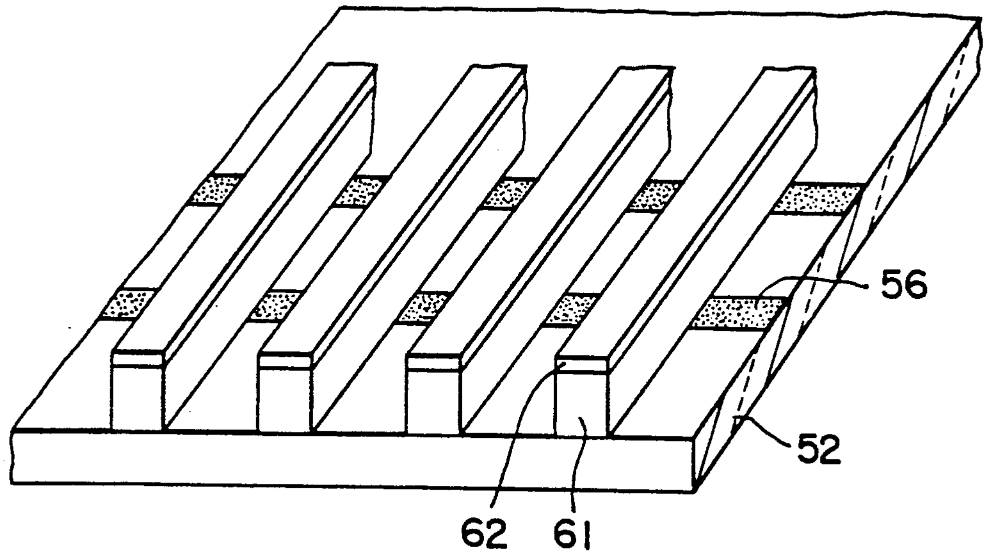

A phosphor paste of green color was printed and dried 7 or 8 times by the screen printing method to form linear cell barriers 61 so as to be normal to the cathode elements 56 as described with respect to the cell barrier of matrix arrangement. Each of the linear cell barriers 61 has a width of 150 μm, a height of 140 μm and a pitch of 300 μm, and FIG. 8 is a perspective view of the thus formed PDP provided with the linear cell barriers 61.

The phosphor paste utilized consists of $Zn_2SiO_4$:Mn as a phosphor of 65 wt. %, glass frit of low temperature type of 10 wt. %, and solution including ethyl cellulose and BAC (weight ratio: 1:9) of 25 wt. %. Light-absorbing layers 62 were then printed by the screen printing operation on the cell barriers 61.

After these operations, the cell barriers were sintered at a temperature of about 440° C. for 30 minutes to thereby remove the binder and form the monochromatic type PDP with the linear cell barriers themselves being the phosphor screen. Accordingly, the linear cell barriers themselves were energized and illuminated by ultraviolet rays from a plasma discharge, so that the viewer 58 can visually observe the reflected light of the phosphor screen, thus providing the PDP with improved luminant efficiency.

With this example, it will be easily understood that the linear cell barriers may be formed with the respective phosphor of three colors of R, G and B by utilizing the phosphor pastes of different colors to be printed each with half width of the cell barrier 61 in accordance with the processes described with reference to the Example 1-2 at a time of forming the linear cell barriers 61.

1-3 Effects

As will be understood from the foregoing descriptions, according to the present invention, the cell barriers constituting display element cells either of matrix shape or of linear shape can be formed by multiple printing operations by utilizing the phosphor pastes including glass frit by the screen printing method, so that the cell barrier can itself be formed as phosphor screen. Accordingly, the cell barrier is itself energized and then illuminated by the ultraviolet rays due to the plasma discharge, so that the viewer can visually observe the reflected light of the phosphor screen, thus providing the PDP with excellent luminant efficiency.

In addition, the formation of a light-absorbing layer on the cell barrier on the side of the viewer prevents the reflection of the external light and, hence, improves the contrast.

Second Embodiment

PDP Manufactured by Photo-process

2-1 Basic Construction

A pattern of the PDP manufactured in accordance with the second embodiment of the present invention is substantially identical to the pattern illustrated in FIG. 3 representing the first embodiment of the present invention.

FIG. 3 represents a PDP provided with a cell barrier of the matrix shape. The cell barrier is formed of a material including a phosphor, and the phosphor including material forming the cell barrier is arranged with different colors each with half width of the cell barrier. In the pattern shown in FIG. 3, the respective three colors of R, G and B are arranged as shown therein and one picture element is composed of the two display elements of green color, one display element of blue color and one display element of red color. This cell barrier is formed by a PDP manufacturing method according to the present embodiment in a manner described in detail hereinafter.

The PDP manufacturing method and, particularly, a cell barrier forming method according to the present embodiment will be described hereunder.

Figure 9:
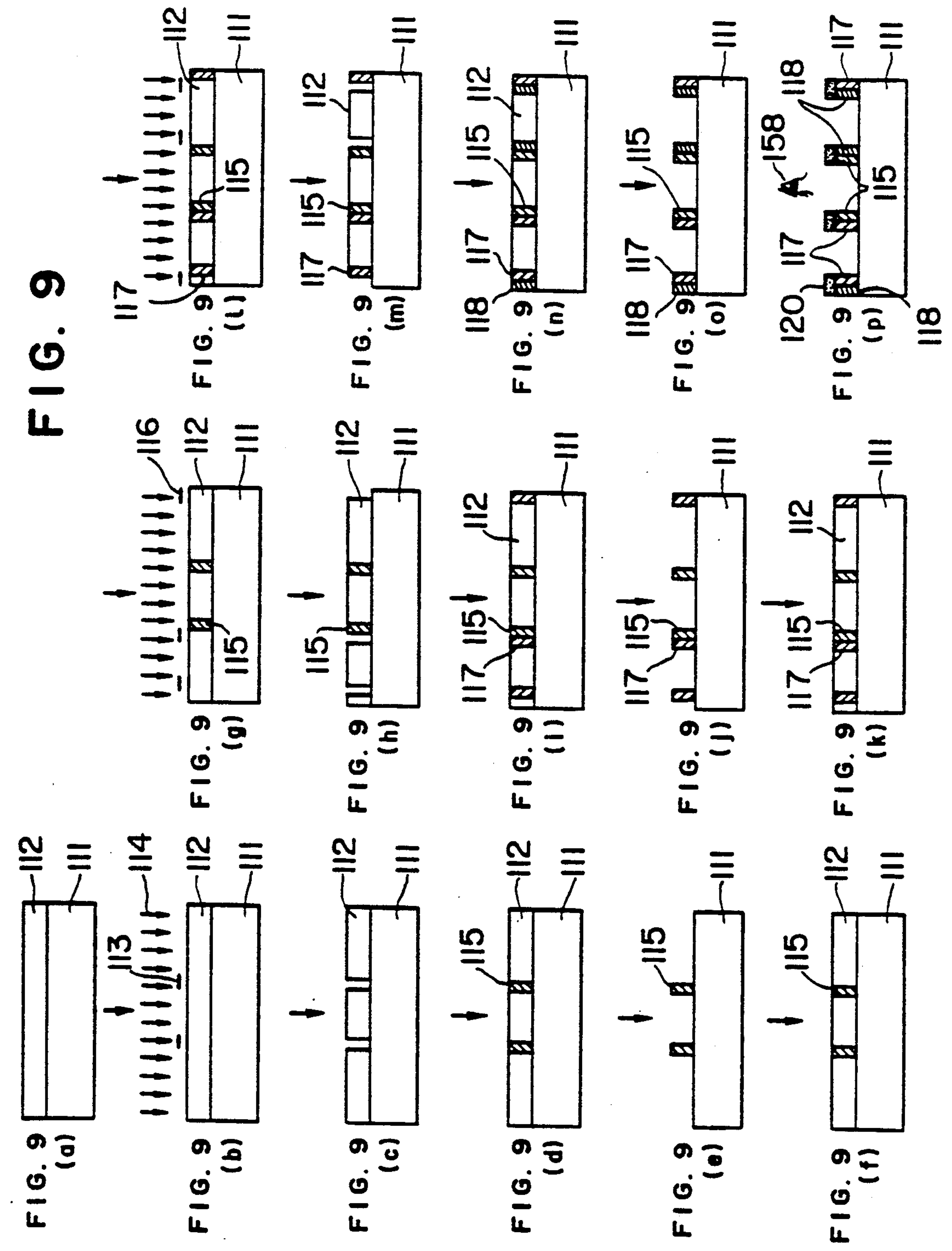

FIG. 9 represents the PDP manufacturing processes of the second embodiment according to the present invention, which shows a series of the steps of forming the cell barrier with the phosphor to be secured to the substrate as a rear plate of the PDP. The illustration of electrodes is now eliminated in FIG. 9, and a pattern of the cell barrier is different from that shown in FIG. 3 for the convenience of the explanation. The respective steps will be described hereunder with reference to FIGS. 9(*a*) to 9(*p*).

First, in the step shown in FIG. 9(*a*), a photo resist 112 to be hardened by the irradiation of light (mainly, ultraviolet rays) is coated uniformly on a transparent substrate 111 such as made of glass with a thickness equal to the height of a cell barrier to be desired.

It is desired to use the photo resist 112 of a type not having a considerably strong bonding property because a portion of the photo resist not hardened will be easily removed from the substrate 111 in the following step shown in FIG. 9(*c*). In a case where the hardened portion of the photo resist 112 is removed at the same time of sintering a slurry including a phosphor in the following step shown in FIG. 9(*e*), it will be necessary to select a photo resist of the type which can be thermally decomposed at the sintering temperature.

In the step shown in FIG. 9(*b*), a mask 113 having a shape corresponding to a pattern of the cell barrier made of a phosphor of the first desired color is arranged to a predetermined portion and a light 114 is irradiated under this condition to harden the photo resist 112.

After the hardening of the photo resist 112, as shown in FIG. 9(*c*), a portion not hardened is removed by a developing process such as by spraying a developing solution or impregnating into a developing solution. In a case where the portion not hardened is impregnated in the developing solution, ultrasonic wave or brushing means may be commonly utilized.

In the next step shown in FIG. 9(*d*), the slurry solution 115 composed of the phosphor of the first color, i.e. green color in this embodiment, and a PVA as a binder fills each space between the islands of hardened photo resist, and the slurry containing the phosphor is dried. In this step, it may be possible to use a solution prepared by adding a glass frit to the phosphor slurry solution 115 for increasing the binding force to the substrate 111. The binding force is increased at a time when the phosphor slurry solution 115 with the glass frit is sintered in the following step. In order to increase a bonding strength, it may be possible to use a binding agent such as water glass in place of the glass frit. However, in a case where an organic type binding agent is utilized, it is necessary that the binding agent be thermally decomposed in the following or final sintering process because the presence of the binding agent of this type adversely affects on the discharging phenomenon. Furthermore, in a case where it is desired to harden the phosphor slurry solution 115 by an exposure process in the following step of FIG. 9(*e*), it is necessary to add diazonium salt or ammonium bichromate to provide it with a photosensitive property.

In the step shown in FIG. 9(*e*), the hardened photo resist 112 is removed to obtain a barrier formed of the phosphor. In this step, as described above, it may be desired to add the photosensitive property to the phosphor slurry solution 115 to thereby expose and harden the same after the removal of the photo resist 112. The removal of the hardened photo resist 112 may be performed by a heat treatment method or by utilizing a solvent.

In a case where the hardened photo resist 112 is removed by the heat treatment, a photo resist of the type thermally decomposed is preliminarily selected as a material of the photo resist 112 and this step has to be carried out at a sintering temperature of more than a temperature at which whole the photo resist 112 can be thermally decomposed. However, since if this sintering temperature is too high, there is the fear of degrading the phosphor, so that it is desirable to sinter the photo resist at a temperature of about 400° to 450° C. for about 30 minutes. In this step, if the glass frit is added to the phosphor slurry solution 115, the presence of the glass frit increases the binding strength between the substrate and the phosphor by the sintering process, so that the barrier formed by a substance containing this phosphor hardly broken in the following processes or working.

In a case where the photo resist 112 is removed by utilizing the solvent, it is necessary to preliminarily select the binder of the phosphor slurry solution 115 and the photo resist 112 made of substances having solubilities different with each other with respect to the solvent. For example, a water series substance will be selected as the binder of the phosphor slurry solution 115 and a substance to be dissolved by the solvent will be selected as the photo resist 112. According to these selections, the cell barrier formed by the phosphor slurry solution can maintain its shape without being suffered from the solvent during a period when the photo resist 112 is peeled off by the solvent. In a case where the glass frit is preliminarily added in the phosphor slurry solution 115, the phosphor is secured to the substrate at the same time as that the phosphor slurry solution is hardened by the sintering process after the removal of the photo resist 112.

In this stage, the cell barrier of the first one color is formed.

In the following step shown in FIG. 9(*f*), the photo resist 112 is coated so as to have a thickness substantially equal to the height of a cell barrier to be formed by the manner identical to that described with reference to the step shown in FIG. 9(*a*).

In the next step shown in FIG. 9(*g*), a mask 116 is arranged to a portion at which a cell barrier made of the phosphor of the second color (blue in this embodiment) and then exposed in the manner described with reference to the step shown in FIG. 9(*b*).

In the steps shown in FIGS. 9(*h*), 9(*i*) and 9(*j*), a portion not hardened of the photo resist is removed by the developing treatment, the phosphor slurry solution 117 fills the space between the barriers with the first-color phosphor (green) and the island of hardened photoresists, the phosphor slurry solution is dried, and the hardened photo resist is removed as carried out in the proceeding steps of FIGS. 9(*c*), 9(*d*) and 9(*e*).

In this stage, the cell barrier of the second color is formed.

In the following steps shown in FIGS. 9(*k*), 9(*l*), 9(*m*), 9(*n*) and 9(*o*), a cell barrier of the third color (red in this embodiment) is formed by repeating the steps substantially identical to those shown in FIGS. 9(*f*) to 9(*j*).

In this stage, the cell barrier of the third color is formed.

In a case where the photo resist is removed by utilizing the solvent and the sintering process is not carried out during the intermediate steps, it is necessary to perform the sintering process to remove the organic substance from the phosphor slurry solution. In this case, it will be proper to adopt a sintering temperature of about 400° to 450° C. for about 30 minutes.

According to the continuous steps described above, the cell barrier formed of the phosphor including material and the thus formed cell barrier is provided with the respective different color (R, G, B) phosphor having a width equal to half width of the cell barrier.

Finally, in the step shown in FIG. 9(*p*), light-absorbing layers 120 are formed on the cell barriers 115, 117 and 118 (on the side of the viewer 158) by the manner described with reference to the first embodiment.

In the foregoing descriptions regarding the embodiments according to the present invention, the cell barriers of the matrix shape were referred to, but the present invention can be applied to the cell barrier of the strip shape by substantially the same manner as that described hereinbefore.

There were also described hereinbefore the examples in which the cell barriers were formed on the rear plate by the photo process and the light-absorbing layer were formed on the thus formed cell barrier, but the present invention is not limited to these examples and it may be possible to first form the light-absorbing layer on the front plate and then form the cell barrier on this light-absorbing layer.

2—2 Example

One preferred example will be described hereunder with reference to the basic construction of the embodiment of the present invention described hereinabove.

A cathode element was first formed by printing an Ni paste on a substrate (constituting a rear plate) made of soda lime glass with a width of 300 μm, a height of 20 μm and a pitch of 1 mm by the screen printing operation and then drying and sintering the thus printed cathode element. An APR as a photo resist (made by ASAHI KASEI KOGYO KABUSHIKI KAISHA) was coated uniformly to cover the cathode element to a height of 150 μm. An exposure was then performed by utilizing a film mask (having a pattern shown in FIG. 10A) having a masking portion having a width of 150 μm. The APR is not hardened in the presence of oxygen, so that a PET film was bonded on the APR and the mask was placed on the film and exposed to the ultraviolet rays. Developing treatment was performed by utilizing warm water mixed with predetermined amounts of boric acid and activator.

As the first color phosphor slurry solution, was utilized $Zn_2SiO_4$:Mn as green color phosphor together with a binder composed of the PVA and water and with, as a binding agent, a glass frit of the low temperature type GA-9 (made by NIHON DENKI GARASU KABUSHIKI KAISHA) so that the phosphor slurry solution may consists of the phosphor 60 wt. %, the glass frit 15 wt. %, the PVA 3 wt. % and water 22 wt. %.

The removal of the APR as the photo resist was performed by utilizing trichloroethane and after the removal of the APR, a sintering process was carried out at a temperature of 450° C. for 30 minutes, thus forming the cell barrier made of the first color phosphor.

Figure 10A:
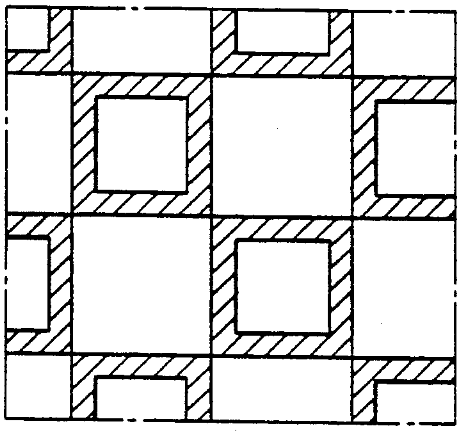
FIGS. 10A and 10B are views showing patterns of film masks utilized for actual examples.
Figure 10B:
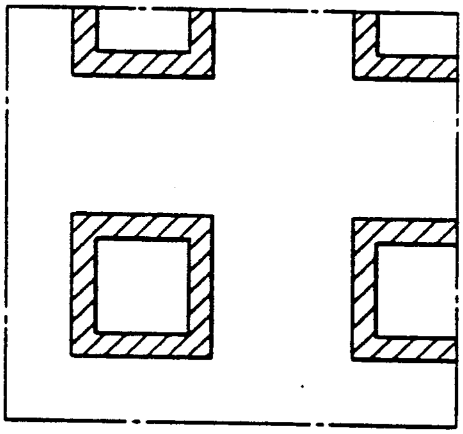
Figure 11:
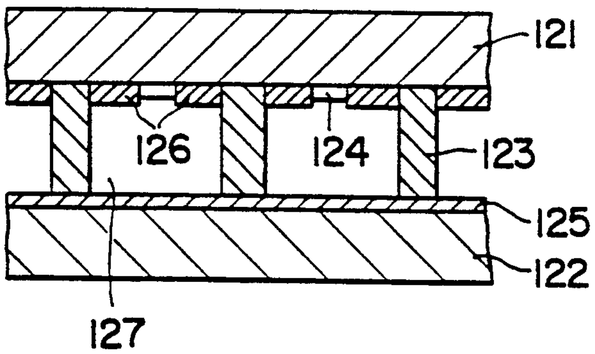
FIG. 11 PRIOR ART
FIG. 11 is a sectional view of a conventional DC-type plasma display panel.
Figure 12:
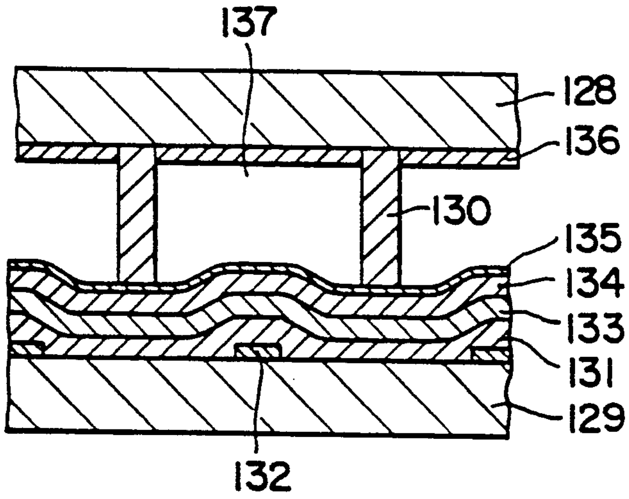
FIG. 12 PRIOR ART
FIG. 12 is a sectional view of a conventional AC-type plasma display panel.

Regarding the second and third colors, $BaMgAl_{14}O_{23}$:Bu (blue color) and $(Y,Gd)BO_3$:Bu (red color) were utilized as the respective phosphor and cell barriers of these colors were formed by utilizing a film mask having a pattern shown in FIG. 10B by the same manner as that described with respect to the first color. Light-absorbing layers were formed on the cell barrier by the screen printing method. In FIGS. 10A and 10B, hatching portions denote light shielding portions and the other portions denote light permitting portions.

After the formation of the cell barrier on the rear plate in the manner described above, the rear plate was mated with a front plate on which an Au electrode having a width of 200 μm, a height of 20 μm and a pitch of 1 mm as an anode element to form a panel. A lumination tests carried out resulted in good condition.

2-3 Effects

According to the present invention, since the cell barrier is formed of the phosphor including material of different colors each having a width corresponding to a half width of the cell barrier, the cell barrier of the PDP of the present invention can be itself formed as the phosphor screen, thus being excellent in the performance of the phosphor screen inside the cell. Accordingly, when the cell barriers are themselves energized and then luminated by the ultraviolet rays due to the plasma discharge, the viewer can visually observe the reflected light of the phosphor screen with high performance.

In addition, according to the PDP manufacturing method of the present invention, the cell barriers are formed by the photo process utilizing the phosphor slurry solution, so that the wall surfaces of the respective cell barriers can be formed as phosphor screens of the respective colors easily and accurately. This results in the formation of the PDP capable of visually observing the reflecting light and highly improving the luminant efficiency.

What is claimed is:

1. A plasma display panel comprising:
- a front plate disposed on a side of a viewer;
- a rear plate disposed parallel to said front plate in an opposing relation; and
- a pair of opposed electrodes and cell barriers as display elements arranged between said front and rear plates, said cell barriers being of a matrix or linear structure and forming a plurality of cells, wherein said cell barriers are formed by successively printing a phosphor-containing material in an overlapping manner by a screen printing method, and said cell barriers are composed only of the phosphor-containing material.

2. The plasma display panel according to claim 1, wherein each of said cell barriers is composed of two portions, each portion having a width corresponding to one half a width of each of said cell barriers, and each portion being formed of a phosphor containing material of a different color.

3. The plasma display panel according to claim 1, wherein a light absorbing layer is formed on each of said cell barriers on the side of the viewer.

4. A plasma display panel comprising:
- a front plate disposed on a side of a viewer;
- a rear plate disposed parallel to said front plate in an opposing relation; and
- a pair of opposed electrodes and cell barriers as display elements arranged between said front and rear plates, said cell barriers being of a matrix or linear structure and forming a plurality of cells, wherein said cell barriers are formed by inserting a phosphor-containing material in portions around a photoresist pattern and removing the photoresist pattern, and said cell barriers are composed only of the phosphor-containing material.

5. The plasma display panel according to claim 4, wherein each of said cell barriers is composed of two portions, each portion having a width corresponding to one half a width of each of said cell barriers, and each portion being formed of a phosphor containing material of a different color.

6. The plasma display panel according to claim 4, wherein a light absorbing layer is formed on each of said cell barriers on the side of the viewer.

* * * * *